(12) United States Patent
Guerrido

(10) Patent No.: US 8,251,446 B1
(45) Date of Patent: Aug. 28, 2012

(54) ARTICULATED CHILD SEAT APPARATUS

(76) Inventor: Natalie R. Guerrido, Roosevelt, NY (US)

( * ) Notice: Subject to any disclaimer, the term of this patent is extended or adjusted under 35 U.S.C. 154(b) by 140 days.

(21) Appl. No.: 12/962,176

(22) Filed: Dec. 7, 2010

(51) Int. Cl.
- *A47D 1/10* (2006.01)
- *B60N 2/26* (2006.01)
- *B60N 2/28* (2006.01)

(52) U.S. Cl. ............ 297/256.1; 297/250.1; 297/256.13; 297/344.11; 297/362; 297/362.11

(58) Field of Classification Search ........... 297/250.1, 297/256.1, 256.13, 344.11, 362, 362.1, 362.11; 248/346.07

See application file for complete search history.

(56) References Cited

U.S. PATENT DOCUMENTS

| | | | |
|---|---|---|---|
| 6,454,350 B1 | 9/2002 | Celestina-Krevh et al. | |
| 6,692,073 B1 | 2/2004 | Weathersby | |
| 6,739,659 B2 * | 5/2004 | Dukes | 297/256.13 |
| 6,739,660 B2 | 5/2004 | Dukes | |
| 7,073,859 B1 | 7/2006 | Wilson | |
| 7,387,336 B2 * | 6/2008 | Sakumoto | 297/250.1 |
| 7,887,128 B2 * | 2/2011 | Zink et al. | 297/256.13 |
| 7,926,875 B2 * | 4/2011 | Schmale | 297/344.11 |
| 2001/0011839 A1 * | 8/2001 | Mori | 297/256.13 |
| 2003/0160486 A1 * | 8/2003 | Dukes | 297/256.13 |
| 2006/0181124 A1 * | 8/2006 | Kish | 297/256.1 |

* cited by examiner

*Primary Examiner* — Rodney B White

(57) ABSTRACT

The articulated child seat apparatus provides a base, a plurality of spaced apart rotatable rungs disposed laterally within the base, a pinion gear disposed on each rung, a rack disposed above and in communication with each pinion gear, a reversible motor driving one of the pinion gears, whereby the rack is moved forwardly and rearwardly within the base, a platform affixed to the rack and extended upwardly from the base, a seat bottom affixed to the platform, a seatback affixed to the seat bottom by a pivot, a reversible motor disposed within the seatback, the motor in communication with the pivot, whereby the seat back is pivoted upwardly and downwardly, a remote control separately controlling each motor, and a harness system fitted within the seat bottom and seatback.

8 Claims, 3 Drawing Sheets

ARTICULATED CHILD SEAT APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Child seats are ubiquitous and typically fall into categories of simplicity and of those having optional functions, such as further security features for example. As child seats particularly suited to autos appear to be those most prominently used, continual improvements in such seats are ongoing. Quite often, auto child seats are relegated to back seat use, for safety and convenience of other passengers. When a child is seated in an auto child seat, they quite often complain and squirm, as such seats are inherently too confining for little ones who would like to sometimes change their seated position. Also, children often fall asleep in their child seat. If a parent has to turn around to adjust the child's comfort in some way, that same parent risks driving hazards, or, even if not driving, risks waking a sleeping child. And, various comforting adjustments for the seats are usually not provided. All of us have witnessed children sleeping in their car seat, with head fallen over at terribly awkward angles, and body slumped uncomfortably, whether in or out of a car.

What has been needed is a child seat that provides adjustments for comfort, and also optional remote controlled adjustments that negate another person having to somehow adjust the child's seating. The present apparatus provides these solutions.

FIELD OF THE INVENTION

The articulated child seat apparatus relates to child seats and more especially to a child seat apparatus that is especially suited to auto use and that provides comfort adjustments in seat bottom movement and seat back articulation.

SUMMARY OF THE INVENTION

The general purpose of the articulated child seat apparatus, described subsequently in greater detail, is to provide an articulated child seat apparatus which has many novel features that result in an improved articulated child seat apparatus which is not anticipated, rendered obvious, suggested, or even implied by prior art, either alone or in combination thereof.

To attain this, the articulated child seat apparatus provides for seat bottom movement, for and aft, and seatback tilt, from upright to fully reclined and any position there between. By providing these comfort choices, a small child can more easily be accommodated, especially when reclining is desirable. Of further importance is that the movements of both seatback and seat bottom are motorized, and each separately controlled by a reversible motor. The motors may be controlled by several means that include but are not limited to the illustrated remote control, controls on the base, controls on the seat bottom and seatback, and even controls integral to the automobile in which the apparatus is placed. The optional remote control for the motors may be extremely important, as a driver is thereby alleviated the task of trying to either stop or to even drive while adjusting the child seat for a child. This provides greater safety in auto operation, greater convenience, and more comfort for a child, as no operator need be immediately close to the child and therefore, for example, no risk waking a sleeping child.

Thus has been broadly outlined the more important features of the improved articulated child seat apparatus so that the detailed description thereof that follows may be better understood and in order that the present contribution to the art may be better appreciated.

An object of the articulated child seat apparatus is to provide greater seating comfort for a small child by providing seat adjustments.

Another object of the articulated child seat apparatus is to provide greater seating comfort for a small child with motorized seat controls for seat adjustments.

A further object of the articulated child seat apparatus is to provide remotely controlled seat adjustments.

These together with additional objects, features and advantages of the improved articulated child seat apparatus will be readily apparent to those of ordinary skill in the art upon reading the following detailed description of presently preferred, but nonetheless illustrative, embodiments of the improved articulated child seat apparatus when taken in conjunction with the accompanying drawings.

DETAILED DESCRIPTION OF THE DRAWINGS

With reference now to the drawings, and in particular FIGS. 1 through 6 thereof, the principles and concepts of the articulated child seat apparatus generally designated by the reference number 10 will be described.

Figure 1:
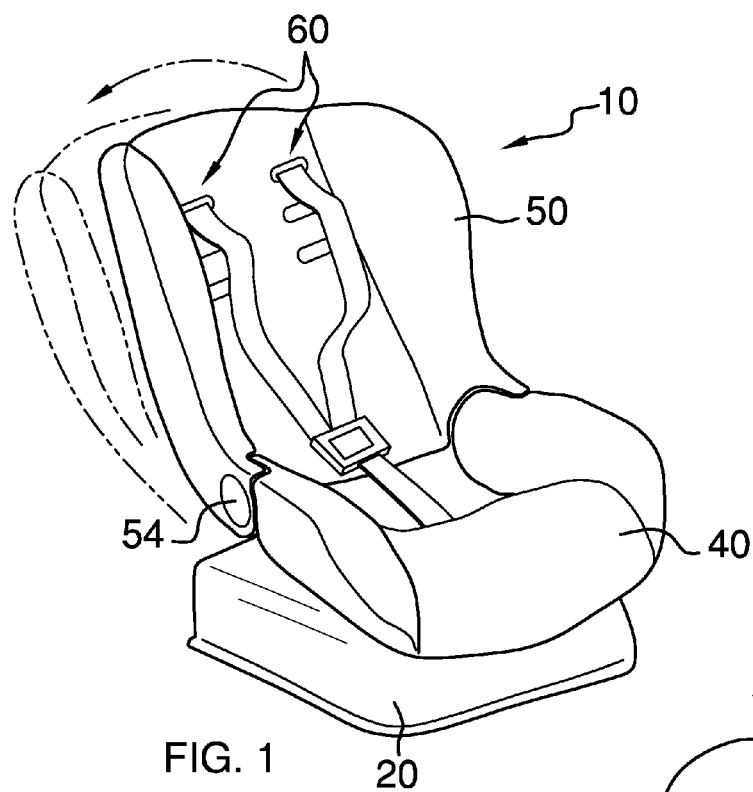
FIG. 1 is a perspective view.

Referring to FIG. 1, the apparatus 10 partially comprises a base 20.

Figure 4A:
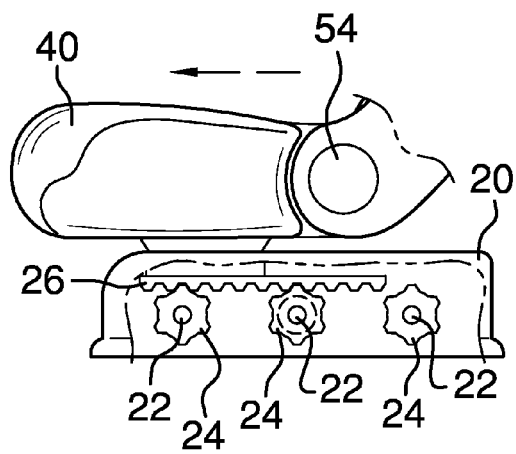
FIG. 4a is a lateral partial cross sectional elevation view, seat platform moved forwardly.
Figure 4B:
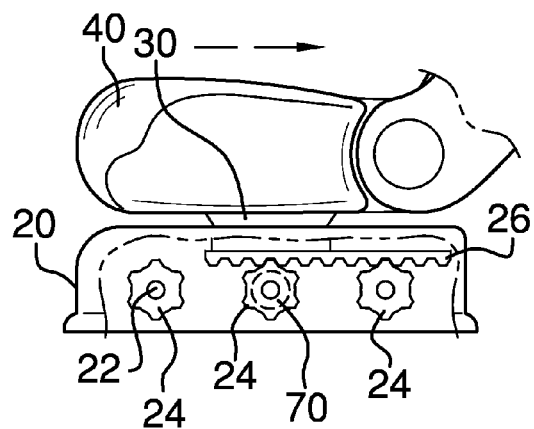
FIG. 4b is a lateral partial cross sectional elevation view, seat platform moved rearwardly.

Referring to FIGS. 4a and 4b, the base 20 further comprises the plurality of spaced apart rotatable rungs 22 disposed laterally within the base 20. One rung 22 is disposed most forwardly. One rung 22 is disposed most rearwardly. One rung 22 is disposed in the center. The rungs 22 thereby offer best support for the rack 26. A pinion gear 24 is disposed on each rung 22. The rack 26 is disposed above and in communication with each pinion gear 24.

Figure 5:
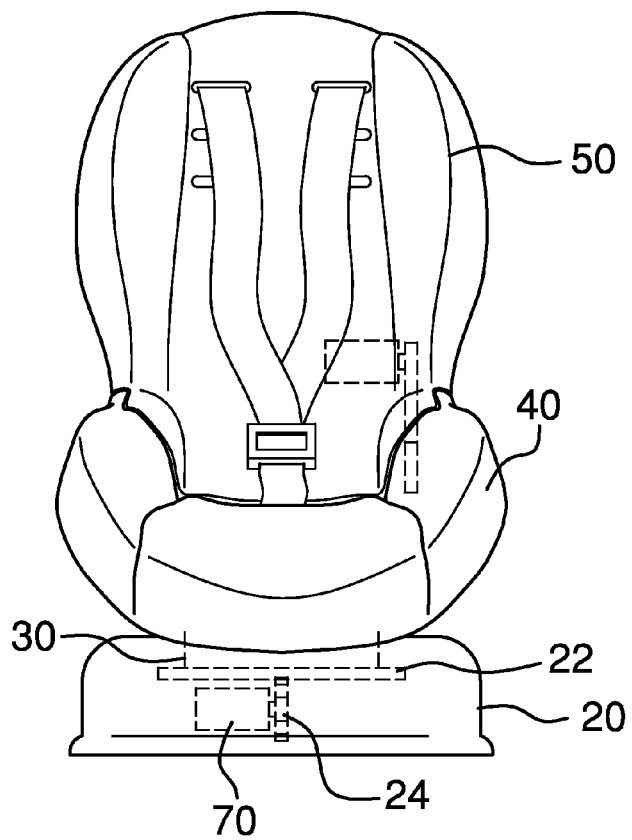
FIG. 5 is a frontal, partial cross sectional view.

Referring to FIG. 5, a reversible motor 70 drives one of the pinion gears 24. Preferably, each pinion gear 24 is further centrally disposed within the base 20. The rack 26 is moved forwardly and rearwardly within the base 20 by the motor 70.

Figure 2:
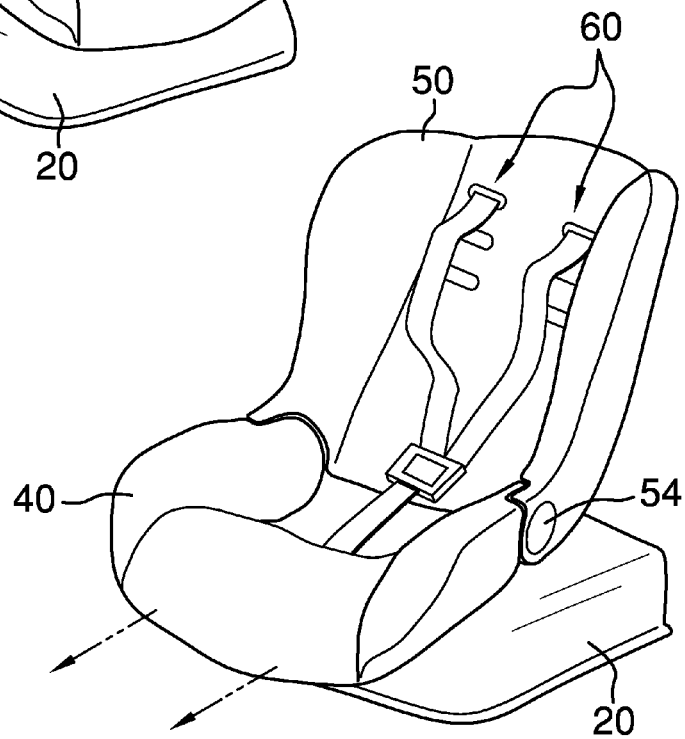
FIG. 2 is a perspective view, seat platform moved forwardly on the base.

Continuing to refer to FIGS. 4a and 4b and referring also to FIG. 2, the platform 30 is affixed to the rack 26 and is extended upwardly from the base 20. The seat bottom 40 is affixed to the platform 30 and the seat bottom 40 is thereby moved forwardly and rearwardly in relation to the base 20.

Figure 3:
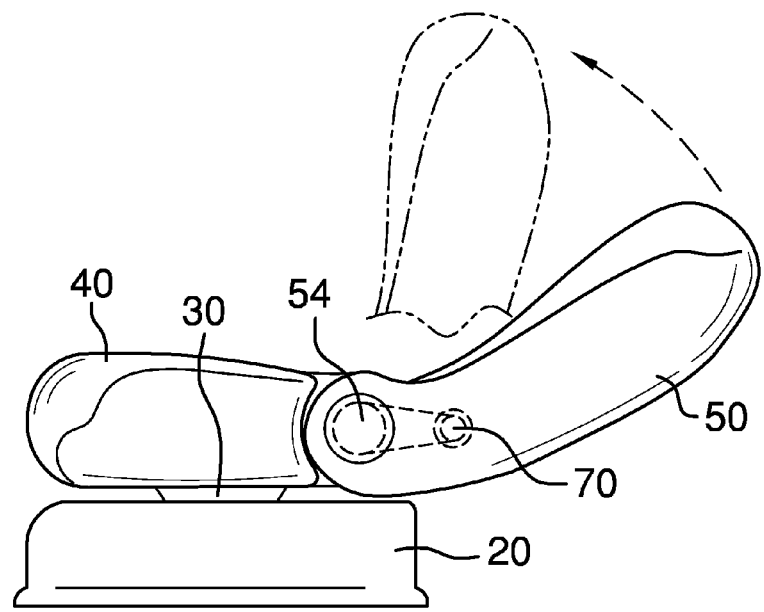
FIG. 3 is a lateral elevation view, seatback articulated backwardly.

Referring to FIG. 3, the seatback 50 is affixed to the seat bottom 40 by a pivot 54. A reversible motor 70 is disposed within the seatback 50. The motor 70 is in communication with the pivot 54. The seatback 50 is thereby pivoted upwardly and downwardly.

Figure 6:
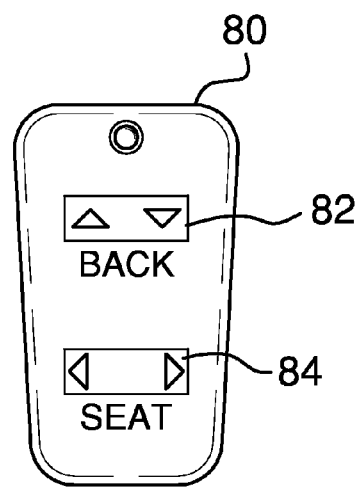
FIG. 6 is a top plan view of the remote.

Referring to FIG. 6, the remote control 80 separately controls each motor 70. The remote control provides back control 82 and bottom control 84.

Referring to FIG. 2, a harness system 60 is fitted within the seat bottom 40 and seatback 50.

Referring to FIGS. 4a and 4b, the base reversible motor 70 is further in communication with the center rung 22 pinion gear 24.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the articulated child seat apparatus may be used.

What is claimed is:

1. An articulated child seat apparatus comprising, in combination:
   a base;
   a plurality of spaced apart rotatable rungs disposed laterally within the base;
   a pinion gear disposed on each rung;
   a rack disposed above and in communication with each pinion gear;
   a reversible motor driving one of the pinion gears;
   whereby the rack is moved forwardly and rearwardly within the base;
   a platform affixed to the rack and extended upwardly from the base;
   a seat bottom affixed to the platform;
   a seatback affixed to the seat bottom by a pivot;
   a reversible motor disposed within the seatback, the motor in communication with the pivot;
   whereby the seat back is pivoted upwardly and downwardly;
   a means for controlling each motor;
   a harness system fitted within the seat bottom and seatback.

2. The apparatus according to claim 1 wherein each pinion gear is further centrally disposed.

3. The apparatus according to claim 2 wherein the base reversible motor is further in communication with the pinion gear of the center rung.

4. The apparatus according to claim 1 wherein the base reversible motor is further in communication with the pinion gear of the center rung.

5. An articulated child seat apparatus comprising, in combination:
   a base;
   a plurality of spaced apart rotatable rungs disposed laterally within the base;
   a pinion gear disposed on each rung;
   a rack disposed above and in communication with each pinion gear;
   a reversible motor driving one of the pinion gears;
   whereby the rack is moved forwardly and rearwardly within the base;
   a platform affixed to the rack and extended upwardly from the base;
   a seat bottom affixed to the platform;
   a seatback affixed to the seat bottom by a pivot;
   a reversible motor disposed within the seatback, the motor in communication with the pivot;
   whereby the seat back is pivoted upwardly and downwardly;
   a remote control separately controlling each motor;
   a harness system fitted within the seat bottom and seatback.

6. The apparatus according to claim 5 wherein each pinion gear is further centrally disposed within the base.

7. The apparatus according to claim 6 wherein the base reversible motor is further in communication with the center rung pinion gear.

8. The apparatus according to claim 5 wherein the base reversible motor is further in communication with the center rung pinion gear.

* * * * *